(12) United States Patent
Choplin (10) Patent No.: US 11,136,199 B2
(45) Date of Patent: Oct. 5, 2021

(54) PRODUCTION OF BATCHES OF PRODUCTS FOR PALLETIZING IN LAYERS

(71) Applicant: SIDEL PACKING SOLUTIONS, Corcelles-les-Citeaux (FR)

(72) Inventor: Grégory Choplin, Corcelles-les-Citeaux (FR)

(73) Assignee: SIDEL PACKING SOLUTIONS, Corcelles-les-Citeaux (FR)

( * ) Notice: Subject to any disclaimer, the term of this patent is extended or adjusted under 35 U.S.C. 154(b) by 0 days.

(21) Appl. No.: 16/495,086

(22) PCT Filed: Mar. 15, 2018

(86) PCT No.: PCT/FR2018/050629
§ 371 (c)(1),
(2) Date: Sep. 17, 2019

(87) PCT Pub. No.: WO2018/167437
PCT Pub. Date: Sep. 20, 2018

(65) Prior Publication Data
US 2021/0114817 A1    Apr. 22, 2021

(30) Foreign Application Priority Data
Mar. 17, 2017    (FR) ..................... 1752222

(51) Int. Cl.
*B65G 47/08*    (2006.01)
*B65G 47/14*    (2006.01)
(Continued)

(52) U.S. Cl.
CPC ......... *B65G 47/244* (2013.01); *B65G 47/088* (2013.01); *B65G 2201/0244* (2013.01); *B65G 2203/0233* (2013.01); *B65G 2203/042* (2013.01)

(58) Field of Classification Search
CPC ........ B65G 47/08; B65G 47/14; B65G 47/24; B65G 47/244
(Continued)

(56) References Cited

U.S. PATENT DOCUMENTS 5,035,315 A * 7/1991 Fukusaki ............. B65G 47/082
198/419.2
6,390,276 B1 * 5/2002 Haug ....................... B65B 5/06
198/377.01

(Continued)

FOREIGN PATENT DOCUMENTS

DE    102004048515 A1    4/2006
EP    2243732 A2    10/2010
(Continued)

OTHER PUBLICATIONS

International Search Report dated Jun. 15, 2018 for PCT/FR2018/050629.
Preliminary Search Report dated Nov. 30, 2017 for FR1752222.

Primary Examiner — Douglas A Hess (57) ABSTRACT

The present invention relates a device (1) for producing batches (2) of products (3) from a plurality of products (3), said batches having a predefined configuration for palletizing in layers carried out downstream, said device comprising an upstream conveyor (4) which extends in a first conveying direction (6) and on which the products (3) are aligned in a row (5), a downstream receiving surface (7) intended to receive said batches, and a moving means (8) intended to transfer the products (3) brought by the upstream conveyor (4) to the downstream receiving surface (7). The moving means (8) comprises a main rail (9) and a plurality of shuttles (10) that are movable independently of one another and travel on said rail (9), each shuttle being intended to receive at least one product (3) on its upper surface. The
(Continued)

present invention also relates an installation comprising this device and a corresponding method.

20 Claims, 3 Drawing Sheets

(51) Int. Cl.
    *B65G 47/24* (2006.01)
    *B65G 47/244* (2006.01)

(58) Field of Classification Search
    USPC ........................................................ 198/426
    See application file for complete search history.

(56) References Cited

U.S. PATENT DOCUMENTS

| | | | |
|---|---|---|---|
| 6,516,939 B1 * | 2/2003 | Schmidt | B65G 47/5104 141/169 |
| 6,843,360 B2 * | 1/2005 | Peterman | B65B 35/405 198/418.6 |
| 7,220,094 B2 * | 5/2007 | Cerutti | B65B 23/14 198/430 |
| 8,448,775 B2 * | 5/2013 | Feigel | B65G 29/02 198/418.6 |
| 8,672,117 B2 * | 3/2014 | Stahl | B65B 23/14 198/418.2 |
| 8,770,909 B2 * | 7/2014 | Parker | B65G 47/32 414/729 |
| 9,008,831 B1 | 4/2015 | Jacobs et al. | |
| 9,205,994 B2 * | 12/2015 | Overley | B65B 35/46 |
| 10,737,403 B2 * | 8/2020 | Bauer | B65G 47/682 |
| 2013/0068589 A1 | 3/2013 | Overley et al. | |
| 2014/0262685 A1 | 9/2014 | Job et al. | |
| 2015/0107959 A1 | 4/2015 | Engelhardt et al. | |

FOREIGN PATENT DOCUMENTS

| | | |
|---|---|---|
| EP | 2471728 A1 | 7/2012 |
| WO | 2008138556 A2 | 11/2008 |
| WO | 2010106529 A1 | 9/2010 |
| WO | 2015007342 A1 | 1/2015 |
| WO | 2015014559 A1 | 2/2015 |
| WO | 2015071228 A1 | 5/2015 |
| WO | 2015162182 A1 | 10/2015 |
| WO | 2016177972 A1 | 11/2016 |
| WO | 2016200751 A1 | 12/2016 |

* cited by examiner

PRODUCTION OF BATCHES OF PRODUCTS FOR PALLETIZING IN LAYERS

The present invention pertains to the field of the preparation of products for their dispatch and the subject matter thereof is, first, a particular device for producing batches of products, an installation comprising such a device, and also a method implementing this device.

In this field, the products that are processed are generally of box, carton, bundle or other type, containing objects of the flask, bottle, etc. type. These objects are generally organized in a rectangular pattern, with or without being staggered, and are kept together by being sheathed in plastic film, for example, resulting in a bundle, with or without a bottom part in the form of a cardboard tray. These products are thus obtained with the aid of a packaging step from individually finished objects, the step consisting in forming groups within which the objects are held together, such as bundles, for example. These groups are generally in the form of a rectangular base, a plurality of objects extending along each of the two edges. Bundles may then be obtained with the aid of a shrink-wrapper, in which, generally, a film is sheathed around each group of objects and then a heating oven ensures, by means of shrinking, that all the various objects in one and the same group are kept together. After this packaging step, the products travel spaced apart from one another, in one or more rows.

After this step of packaging objects in boxes or in bundles, the products thus obtained undergo a palletizing step during which they are regrouped and potentially reoriented in order to form batches with a predefined formation with a view to obtaining layers to be arranged one on another on pallets. The batches may notably correspond to a row or part of a row of a layer of products present on the pallet.

U.S. Pat. No. 7,896,151 B2 describes notably the formation of rows of layers for palletizing. This document thus proposes providing three conveyors one after another, operating at different speeds. The arrangement of the rows is effected on the basis of a single-file flow of products in contact with one another. Groups of products are then obtained upon passing from the first to the second conveyor, adjusting the difference in their speed in order to create a space between two successive products at predefined locations. At this stage, the flow is then composed of individual products and/or groups of products. A robot then makes it possible to move the products or groups of products transversely and/or to cause them to turn on the vertical axis in order to lead to the rows.

Document US2005/0246056A1 relates to the formation of palletizable layers with the aid, also, of three conveyors one after the other, operating at different speeds. The products travel on the first conveyor in contact with one another in at least one row. The second conveyor operates at a higher speed than the first conveyor in order to space the products from one another. Next, the products are grouped or not grouped with the aid of a cyclic spacer. Finally, a robot arranges the groups of products and/or the individual products in order to form a palletizable layer having a predefined configuration.

DE 10219 129 A1 proposes a gripping means capable of selectively seizing a group of products from an assembly of products and turning them through 90°.

EP 2 792 623 A1 relates to the formation of a palletizable layer of products having a predefined configuration by introducing a handling machine arranged between two conveyors perpendicular to one another. The handling machine seizes the packs traveling in a single row at the outlet from the first conveyor, deflects them and orients them by taking account of the predefined formation, then transfers them onto the second conveyor. A retention element perpendicular to the direction of transportation of the second conveyor then enables the products to accumulate in order to form the required palletizable layer.

EP 2 185 448 B1 describes a system for conveying products in which a gripping device is able to seize the products in order to turn them while advancing them in the conveying direction such as to optimize the conveying rate.

However, in each of the solutions described above, the formation of the groups of products in a given configuration is achieved directly on the conveyors and makes use of a gripping means. This results in friction between the products and the belt of the conveyor supporting them, notably at the time of rotational and translational movements of the products on the belt. Such friction is all the more problematic when it risks spoiling the products and, in particular, causing tearing of the film when the products are in the form of bundles.

Furthermore, the formation of batches of products described above being carried out on belt conveyors on which the products are resting, their position is not accurately known. Thus, it is difficult to program a gripping means to move or to orient the required product precisely when it arrives at the gripping means. It is also difficult to identify what has gone wrong when there is a malfunction of the device when the position of the products is not known precisely. In other words, such a system does not make it possible to guarantee good product traceability.

Furthermore, the adjustment of the respective speeds of two conveyors one after another in order to form batches of products from a compact column is not instantaneous. In other words, when a command requires a conveyor to modulate its speed in order to change from speed x to speed y, its speed varies progressively in order to achieve speed y. This means it is difficult if not impossible accurately to control the space between two products where one is entrained by a conveyor that changes speed with the aid of such a device.

A further drawback of the above solutions lies in that it would appear to be difficult to use one and the same gripping means not only for turning an individual product but also for simultaneously turning a group of a plurality of products, for example a group of four products. Indeed, it is necessary to use a tool adapted to the dimensions of the element to be seized and thus potentially to change tools when the elements to be seized are of different sizes. The solutions described above are thus not amenable to being made modular.

Yet a further drawback of using a gripping means to rotate products is that such a tool may generate impacts between the objects (of the bottle or flask type, for example) making up one and the same product at the time a product or a group of products is seized. Such impacts are undesirable since they result in noise and even a risk of breakage, notably when the objects are made from glass.

There is thus a need to improve on the prior art by contributing at least in part to the solving of the problems identified above and, in particular, a need to provide a system that makes it possible to group products into a wide range of predetermined configurations, to limit sliding between the products and their support, to generate as little noise as possible, and/or precisely to control the position of each product and the distance between two successive products.

The invention thus aims to propose a solution in which one and the same structure may be used for the entire configuration of a palletizable layer and in which the formation of the batches in a required configuration is achieved by positive transfer of the packs, i.e. without relative movement of the pack on its support. Preferably, the invention makes it possible to control the position of each product individually when a batch is formed and thus also the distance between two successive products, while minimizing impacts between the objects that make up one and the same product and thus the noise caused by such impacts.

To that end, the invention proposes producing batches of products having a predefined arrangement from a continuous feed of packs spaced from one another and traveling in a row by using a system of shuttles traveling on a rail. Each shuttle is intended to receive at least one product or pack, and is movable relative to the other shuttles and even capable of turning independently of the other shuttles.

A subject of the invention is thus a device for producing batches of products from a plurality of products, said batches having a predefined configuration for palletizing in layers carried out downstream, said device comprising:
- an upstream conveyor which extends in a first conveying direction and on which the products are aligned in a row;
- a downstream receiving surface intended to receive said batches; and
- a moving means intended to transfer the products brought by the upstream conveyor to the downstream receiving surface.

This device is characterized in that the moving means comprises a main rail and a plurality of shuttles that are movable independently of one another and travel on said rail, each shuttle being intended to receive at least one product on its upper surface.

A further subject of the invention is an installation comprising this device, namely a device for producing batches of products.

This installation is characterized in that it further comprises, mounted downstream of said producing device, a device for forming palletizable layers from batches of products and a palletizing device for stacking the palletizable layers on a pallet.

A further subject of the invention is a method implemented by this device, namely a method for producing at least one batch of products having a predefined configuration from a plurality of products with a view to palletizing in layers carried out downstream.

This method is characterized in that it comprises at least the following steps:
(i) transferring each product originating from an upstream conveyor advancing in a first conveying direction and on which the products are aligned in a row onto a shuttle carried by a rail in a first transfer direction preferably parallel to the first conveying direction, said shuttles being constituted by a lower part and an upper part,
(ii) moving the shuttles along the rail toward a downstream receiving surface independently of one another, modifying the relative position of the shuttles in order to adjust the distance between the products that they carry and to obtain, in the vicinity of said downstream receiving surface, at least one batch of products having a predefined configuration.

The invention will be better understood by virtue of the following description that is based on possible embodiments explained by way of illustration and imposing no limits, with reference to the appended figures in which.

The subject of the invention is thus, first, a device 1 for producing batches 2 of products 3 from a plurality of products 3, said batches having a predefined configuration, for palletizing in layers carried out downstream.

The products 3 are generally boxes or bundles containing objects of the bottle, flask, drum or other type. These objects may be arranged in the form of a pattern, with or without being staggered. A machine of the bundling or boxing type is thus present upstream of the device 1 according to the invention in order to prepare the products 3. In this upstream machine, the objects are organized as a pattern and kept together either by insertion into a box or by packaging in a shrink film to form a self-supporting bundle from the action of heat.

Generally, these products are then palletized in layers, i.e. the products 3 are loaded onto a pallet layer after layer. A layer of products corresponds in principle to an assembly of products 3 extending along the two edges of the pallet and comprising only one product 3 in the vertical direction. To this end, a palletizing scheme is established to determine how to arrange the products 3 in each layer such that the stack of layers arranged on each pallet is as stable as possible.

In order to prepare the palletization in layers of the products 3, it is thus necessary to regroup the products 3 in a predetermined configuration. The device according to the invention aims precisely to form batches 2 of products 3 in a predetermined configuration.

Generally, a batch 2 of products 3 corresponds to a row or part of a row of a layer to be palletized, i.e. one and the same layer comprises a plurality of batches 2 of products 3. A batch 2 of products 3 extends in a single direction, i.e. it is a single product wide. A batch 2 comprises at least two products 3, side by side. The products 3 in one and the same batch generally lie against one another. There may, however, be a small space between two products 3 side by side in one and the same batch 2. This space is preferably smaller than the smallest dimension of the products 3, i.e., in principle, of a size smaller than the width of the base of the products 3.

The configuration of the batches 2 of products 3 is predefined on the basis of the following parameters, which may thus change from one predefined configuration to another:
- the number of products 3 constituting one and the same batch 2,
- the space between two products 3 side by side in one and the same batch, and
- according to certain embodiments, the orientation of the products 3.

A predetermined configuration is thus characterized by a certain number of products 3 with a predefined distance between the products 3 and, potentially, an orientation specific to each product 3, i.e. potentially turned relative to at least one other product 3, for example through a right angle or, alternately, through an angle of 180° about the vertical axis. This predetermined configuration for each batch 2 makes it possible, in the palletizing machine located downstream of the device 1 according to the invention, to stack layers formed from a plurality of batches 2 on one pallet, these layers having a configuration corresponding to that of the palletizing scheme.

The producing device t according to the invention comprises:
- an upstream conveyor 4 which extends in a first conveying direction 6 and on which the products 3 are aligned in a row 5;
- a downstream receiving surface 7 intended to receive said batches 2; and
- a moving means 8 intended to transfer the products 3 brought by the upstream conveyor 4 to the downstream receiving surface 7.

The products 3, originating, for example, from a boxing machine or a shrink-wrapper, are brought on the upstream conveyor 4. This conveyor is generally an extension of the conveyor that transports the products 3 at the outlet from the machine upstream of the device 1. However, the conveyor 4 may be the conveyor that transports the products 3 at the outlet from the machine upstream of the device 1. On this conveyor 4, a row 5 of products 3 extends generally in a first conveying direction 6. The products 3 in one and the same row are preferably regularly spaced from one another, i.e. the distance separating two consecutive products 3 is identical right along the row 5. However, the products 3 may also lie against one another, i.e. touching one another.

The downstream receiving surface 7 may, for example, extend in parallel or perpendicularly to the first conveying direction 6. This surface is intended to receive the batches 2 of products 3 that are prepared on the movement means. It simultaneously receives the products 3 constituting one and the same batch. In the remainder of the text, the term "downstream receiving zone" will be used to denote the zone of the device 1 according to the invention where the batches 2 of products 3 are transferred from the movement means 8 toward the downstream receiving surface 7.

The movement means 8 is capable of receiving products 3 brought by the upstream conveyor 4, and moving them onto the downstream receiving surface 7 while forming the batches 2 having a predetermined configuration.

In the remainder of the text, reference will be made to the "upstream receiving zone", which corresponds to the location of the device 1 according to the invention where the products 3 are transferred onto the movement means 8. This zone may be located at the outlet from the upstream conveyor 4 if the products 3 are transferred directly from the upstream conveyor 4 onto the movement means 8.

With a view to facilitating the transfer of the products 3 onto the movement means 8, the device 1 may also comprise a dead plate 18 (or transfer plate) located at the outlet from the upstream conveyor 4, in its extension in the first conveying direction 6. Such a plate is arranged at the same height as the surface 13 of the upstream conveyor 4 on which the products 3 are resting such that they can easily be brought from the conveyor 4 toward the transfer plate 18. In this case, the products 3 are not transferred directly from the upstream conveyor 4 toward the movement means 8, but transit via the dead plate 18. The upstream receiving zone is then located at the outlet from the dead plate 18. As explained further elsewhere, the advantage of having recourse to a transfer plate 18 is that such a plate may be much thinner than the conveyor 4 and the products 3 leaving such a plate 18 in order to descend onto a shuttle traveling underneath thus suffer a vertical impact that is less hazardous than if they had to descend by the entire thickness of a conveyor 4.

Preferably, the upstream conveyor 4, the movement means 8 and the downstream receiving surface 7 lie in a horizontal plane.

The producing device 1 according to the invention is characterized in that the moving means 8 comprises a main rail 9 and a plurality of shuttles 10 that are movable independently of one another and travel on said rail 9, each shuttle being intended to receive at least one product 3 on its upper surface.

The main rail 9 defines a travel loop and extends from the upstream receiving zone as far as the downstream receiving zone. In other words, when the transfer of the products 3 on the moving means is carried out directly from the upstream conveyor 4, the travel loop extends from the outlet from the upstream conveyor 4 as far as the downstream receiving surface 7. All movement of the products 3 generated by the moving means is achieved with the aid of a rail. When the transfer of the products 3 onto the moving means is carried out from the transfer plate 18, the travel loop extends from the outlet from the transfer plate 18 as far as the downstream receiving surface 7. The shuttles are thus generally surmounted by a product 3 between the upstream receiving zone and the downstream receiving zone, and then travel empty between the downstream receiving zone and the upstream receiving zone.

Each shuttle 10 is intended to receive at least one product 3 on its upper surface, i.e. each shuttle 10 is capable of supporting at least one product 3. Preferably, each shuttle 10 is intended to receive a single product 3.

The shuttles 10 traveling on the rail 9 are movable independently of one another. That is to say that it is possible to bring two successive shuttles closer together or to move them further apart such as to regroup the products 3 that they carry in order to form a batch 2 of products 3 or to space apart two distinct batches 2. In other words, the shuttles 10 are able to move separately from one another. To that end, the shuttles 10 are set in motion by virtue of a linear motor principle. The linear motor function is fulfilled by the rail 9.

The batches are thus advantageously formed or spaced while considerably reducing sliding of the products 3 on their support. Indeed, the batches 2 are formed directly by the movement of the supports of the products 3 and not by movement of the products 3 on their support.

By virtue of the use of the linear motor principle, the speed of each shuttle 10 is variable and the position of each shuttle 10 is controlled for each individual unit and known at any instant. The traceability of the products 3 is thus guaranteed within the moving means 8.

According to a possible additional feature of the device 1 for producing batches 2, the shuttles 10 are constituted by a lower part interacting with the rail 9 and an upper part intended to support at least one product 3, the upper parts of said shuttles 10 being able to undergo a rotation on the vertical axis.

Each shuttle 10 thus comprises two parts:
- a lower part integral with the rail 9 and ensuring the travel of the shuttles 10 on the rail 9, and
- an upper part, also called a platform, that rotates freely on a vertical axis and is able to support at least one product 3, preferably a single product 3.

Thus, the upper part of a shuttle 10 is able to turn relative to its lower part. The platforms of the shuttles 10 are able to turn on the vertical axis, thus giving rise to the rotation of the products 3 that they carry. This makes it possible to achieve a greater variety of configurations of batches 2 and thus of palletizing schemes.

When the platforms of the shuttles 10 are able to turn, the elements that can thus differ from one batch 2 to another are as follows:

the number of products 3 constituting one and the same batch 2, the space between two products 3 side by side in one and the same batch, and/or the orientation of the products 3.

Preferably, the upper parts of the shuttles 10 are capable of undergoing such a rotation independently of one another. Thus, one and the same batch 2 of products 3 may, for example, comprise a product 3 that has undergone a rotation and other products 3 that have not undergone such rotation.

Preferably, the upper parts of the shuttles 10 are able to undergo a rotation through an angle of 90° or of 180°, in particular 90°.

According to another possible additional feature, the moving means 8 comprises at least one additional rail 11 distinct from the main rail 9 downstream of the upstream conveyor 4, the main 9 and additional 11 rails then joining up on a single track before the downstream receiving surface 7.

Such an additional rail 11 is notably useful when the machine located upstream of the device 1, namely, for example, a shrink-wrapper, discharges the products 3 in a single-file flow. In this case, the flow of products 3 brought by the upstream conveyor 4 comprises a plurality of rows of products 3 parallel to one another, generally two, three or four rows 5 of products 3, preferably two or three rows 5, in particular two rows 5. The presence of at least one additional rail 11 thus advantageously makes it possible to form batches 2 of products 3 from products 3 arranged in a plurality of rows 5.

Each additional rail 11 corresponds to a zone of splitting the main rail 9 by means, for example, of two switches. A first switch is thus located upstream of the upstream receiving zone, giving rise to the start of the additional rail 11, and a second switch, arranged between the upstream receiving zone and the downstream receiving zone, enables the additional rail 11 to join up with the main rail 9.

Shuttles 10 travel on the additional rail(s) 11 in the same way as they do on the main rail 9 and are thus also intended for receiving and then moving products 3. The shuttles 10 of the main rail 9 and of the additional rail(s) 11 are synchronized such that they do not collide when the additional 11 and main 9 rails come together to form a single track.

Generally, there are as many rails 9, 11 as there are rows 5 of products 3 carried on the downstream conveyor 4, each of the rails making it possible to manage a row 5. For example, when the products 3 are brought in the form of two rows 5, the moving means 8 comprises a main rail 9 and an additional rail 11. Thus, the shuttles 10 traveling on the main rail 9 receive and then move the products 3 originating from a first row 5 and the shuttles traveling on the additional rail 11 receive and then move the products 3 originating from the other row 5. Thus, in the upstream receiving zone, the main 9 and additional 11 rails lie in the first conveying direction 6, each in the extension of a row 5. The two rails 9, 11 thus travel under the upstream conveyor 4 or, where appropriate, under the transfer plate 18, just before the upstream receiving zone.

The rotation of the platforms of the shuttles 10 may, for example, be generated by a rotation system carried on the shuttles 10 or by an element arranged outside of the shuttles 10.

Thus, according to a further possible additional feature, at least one shuttle 10 carries one rotation system to enable its upper part to undergo a rotation on the vertical axis.

Preferably, each shuttle 10 carries one rotation system such that the upper part of each shuttle 10 is capable of undergoing a rotation on the vertical axis.

Thus, the platforms of the shuttles carrying such a rotation system are able to turn, about the vertical axis, preferably through an angle of 90°.

The platforms of the shuttles are able to turn or not turn independently of one another such as to form batches 2 leading to the formation of layers of products 3 having a configuration in accordance with the predefined palletizing scheme.

According to a further possible additional feature, the device 1 further comprises an element arranged outside of said shuttles 10, this element being capable of causing the upper part of at least one shuttle 10 to undergo rotation on the vertical axis.

Preferably, such an element is capable of causing the platform of each shuttle 10 to undergo rotation on the vertical axis.

As detailed below, this element may, for example, be a stop or a cam, notably a retractable stop or cam. In the working position, such a stop or cam is located on the path of the platforms of the shuttles 10 traveling on the rail 9 such as to turn them about the vertical axis when the platforms enter into contact with the stop or cam. In the rest position, such a stop or cam is arranged such that the platforms are unable to enter into contact therewith.

As detailed below, also, this element may, for example, be an additional shuttle, which is connected to the axis of rotation of the platform of a shuttle 10 to be turned. These two shuttles may be attached by means of a system that makes it possible to generate the rotation of the platform when the shuttle 10 and the additional shuttle that is connected to the shuttle 10 come closer to one another or move further apart.

According to a further possible additional feature, the device 1 further comprises an upstream transverse pusher 12 intended to transfer the products 3 from the upstream conveyor 4 onto the shuttles 10 of the moving means 8 in a first transfer direction 12 parallel to the first conveying direction 6.

Such a pusher extends perpendicularly to the first conveying direction 6 and pushes the products 3, preferably individually, via the rear parallel to the first conveying direction 6. If the products 3 are brought by the conveyor 4 as a single-file flow, there may be as many pushers 12 as there are rows or there may be a single pusher 12 simultaneously pushing a product in each row. At the upstream transverse pusher 12, the device may comprise a sensor such as to be able to synchronize the shuttles 10 with the arrival of the products 3.

When the device 1 lacks a transfer plate 18, the upstream transverse pusher 12 is arranged at the end of the conveyor 4 and pushes the products 3 from the upstream conveyor 4 onto the shuttles 10. When the device 1 comprises a transfer plate 18 in the extension of the upstream conveyor 4, the upstream transverse pusher 12 is arranged on the transfer plate 18 and pushes the products 3 from the transfer plate 18 onto the shuttles 10.

When the products 3 are transferred onto the shuttles 10, the latter are preferably stationary and located in the extension of the upstream conveyor 4 or, if appropriate, of the transfer plate 18, in the first conveying direction.

According to other embodiments, a pusher may extend in the first conveying direction and push the products 3 originating from the upstream conveyor 4 onto the shuttles 10 in a transfer direction perpendicular to the first conveying direction 6. In this case, with a view to facilitating the transfer of the products 3, the upstream conveyor 4 is preferably a distribution conveyor that has rollers orientated perpendicularly to the first conveying direction 6, notably when the device 1 does not comprise a transfer plate 18.

According to a further possible additional feature, the upper surface of said shuttles 10 is offset downward in the vertical direction relative to the surface 13 of said upstream conveyor 4 supporting the products 3 such that the products 3 descend on the shuttles 10 owing to the movement of said upstream conveyor 4.

In this case, the device 1 according to the invention may lack a transfer plate 18 located in the continuation of the upstream conveyor 4. Thus, the products 3 are transferred directly from the upstream conveyor 4 onto the shuttles 10 traveling on the main 9 or additional 11 rail. The products 3 are transferred onto the shuttles 10 by the movement of the upstream conveyor 4 in the first conveying direction 6, which thus entrains the products 3 onto the shuttles 10. The products 3 are thus transferred onto the shuttles in a first transfer direction 12, which is parallel to the first conveying direction.

When a shuttle 10 receives a product 3, it is located in the extension of the upstream conveyor 4, below the upstream conveyor 4. In other words, the horizontal surface of its platform that receives the product 3 is located lower than the surface 13 of the upstream conveyor 4, which supports the products 3 before they are transferred. Preferably, the height difference between these two surfaces is less than the height of the products 3 to be transferred in order to minimize the risk of falling during transfer. Just as according to certain embodiments detailed below, the rail can travel under the conveyor 4 before the upstream receiving zone, and the winding movement of the upstream conveyor 4 is preferably small and notably of a diameter less than the height of the products 3.

A sensor may, for example, be arranged at the end of travel of the upstream conveyor 4 with a view to synchronizing the shuttles 10 with the products 3 such that each shuttle 10 can receive one product 3.

Once the products 3 have been transferred onto the shuttles 10, batches 2 of products 3 having a predetermined configuration are formed along the rail 9, 11 by bringing at least two shuttles 10, each surmounted by one product 3 and potentially by rotation of at least one upper part of one shuttle 10 surmounted by one product 3, closer together or moving them further apart. On the rail 9, 11, two successive batches 2 are separated by a distance greater than that between two successive products in one and the same batch. Indeed, generally, the products 3 in one and the same batch 2 lie preferably against one another but may be spaced by a distance that is conventionally less than the length, or even than the width of the base of the product 3. Conversely, two successive batches 2 are spaced by a distance that is conventionally greater than the width, or even than the length of the base of the product 3.

Once the batches 2 of products 3 have been formed and are present in the vicinity of the downstream receiving surface 7, i.e. in the downstream receiving zone, they are transferred onto the downstream receiving surface 7.

In the downstream receiving zone, the rail 9 is generally located along the downstream receiving surface 7, more precisely along one of the edges of the downstream receiving surface 7 such that the batches 2 are transferred from the shuttles 10 onto the downstream receiving surface 7 in a second transfer direction 14 that is perpendicular to the direction of travel of the shuttles 10 on the rail 9 in this zone. The second transfer direction 14 is preferably parallel or perpendicular to the first transfer direction 12. At the time of transfer, the batches 2 are preferably immobile along the rail 9, i.e. the shuttles 10 carrying the products 3 constituting one and the same batch 2 are stationary on the rail 9.

According to a further possible additional feature, the device 1 further comprises a gripping means intended to seize the batches 2 of products present on the shuttles 10 and to transfer them toward the downstream receiving surface 7 in a second transfer direction 14 perpendicular to the direction of travel of the shuttles 10 on the main rail 9 at this location.

Such a gripping means may notably be a robot gripper. This gripping means simultaneously seizes the products 3 of one and the same batch 2 and then raises them, moves them and deposits them on the downstream receiving surface 7. It carries out this operation batch 2 after batch 2 such as to transfer each batch 2, one after another, onto the downstream receiving surface 7.

According to a further possible additional feature, the device 1 further comprises a downstream transverse pusher 15 intended to transfer the batches 2 of products 3 present on the shuttles 10 toward the downstream receiving surface 7 in a second transfer direction 14 perpendicular to the direction of travel of the shuttles 10 on the main rail 9 at this location.

Such a downstream transverse pusher 15 may be similar to the upstream transverse pusher described above. It simultaneously pushes the products 3 constituting one and the same batch 2 from the rear from the shuttles 10 toward the downstream receiving surface 7. It carries out this operation batch 2 after batch 2 such as to transfer each batch 2, one after another, onto the downstream receiving surface 7.

According to a further possible additional feature, the downstream receiving surface 7 is carried by a downstream conveyor intended to move the batches 2 of products 3 in a second conveying direction.

The downstream conveyor thus extends in a second conveying direction and its upper surface, which supports the batches 2, corresponds to the downstream receiving surface 7.

The second conveying direction is preferably parallel or perpendicular to the first conveying direction 6 and/or the first transfer direction.

Preferably, the second conveying direction is parallel or perpendicular to the second transfer direction 14 of the batches 2 of products 3 from the shuttles 10 onto the downstream receiving surface 7.

When the second conveying direction is parallel to the second transfer direction 14, the rail 9 borders the entry of the downstream conveyor. In other words, the rail 9 is perpendicular to the second conveying direction in the receiving zone. In this case, the batches 2 of products present on the downstream conveyor lie transversely to the second conveying direction.

When the second conveying direction is perpendicular to the second transfer direction 14, the rail 9 borders one of the sides of the downstream conveyor. In other words, the rail 9 is parallel to the second conveying direction in the receiving zone. In this case, the batches 2 of products present on the downstream conveyor lie in the second conveying direction. To this end, the downstream conveyor is generally a distribution conveyor having rollers oriented perpendicularly to the second conveying direction. Thus, the products 2 may be transferred onto the downstream conveyor perpendicularly to the travel direction thereof.

As detailed below, when the second conveying direction is perpendicular to the second transfer direction 14, the rails 9, 11 may define two travel loops, each bordering one of the sides of the downstream conveyor, parallel to the second conveying direction. Two batches 2 may thus be transferred simultaneously onto the downstream conveyor perpendicularly to the second conveying direction.

A further subject of the invention is an installation comprising a device 1 for producing batches 2 of products 3 as defined above, characterized in that it further comprises, mounted downstream of said producing device 1, a device for forming palletizable layers from batches 2 of products 3 and a palletizing device for stacking the palletizable layers on a pallet.

The device for producing layers may quite simply be a vertical retention surface 16 arranged at the outlet from the downstream conveyor perpendicularly to the second conveying direction. Such a surface forms a stop for the products 3 arriving in contact with it.

When the batches 2 of products lie transversely to the second conveying direction, such a surface makes it possible advantageously to retain the batch 2 located furthest downstream, enables the next batch to be retained against the batch located the furthest downstream, and so on and so forth. The batches 2 are thus accumulated one against another until a layer of products 3 to be palletized is obtained.

When the batches 2 of products 3 lie in the second conveying direction, such a surface makes it possible advantageously to retain the product 3 the furthest downstream of each batch 2 constituting the layer to be palletized. The consecutive batches 2 of one and the same layer are then located side by side, the product 3 furthest downstream of each batch 2 being in contact with the retention surface 16.

The device for forming layers may also comprise a gripper that makes it possible to close up the products in one and the same layer one against another.

The palletizing device makes it possible to transfer each layer of products 3 onto a pallet, complying with the predefined palletizing scheme. Such a device transfers the products 3 layer by layer onto a pallet such as to create a stack of layers. Such a device may also insert an insert, notably made from a cardboard or plasticized material, in order to separate two successive layers of products 3 on the pallet. In other words, the palletizer deposits the layers of products 3 one after another on a pallet, while ensuring satisfactory stability of the stack of layers formed on the pallet.

According to a possible additional feature, the installation according to the invention further comprises, mounted upstream of said producing device 1, a machine 17 delivering the products 3 traveling aligned in a row 5 in a first conveying direction 6.

Preferably, the machine 17 is a shrink-wrapper or a boxing machine. Such a machine 17 is able to discharge a single-file or multi-file flow of products 3. In each row 5, the products 3 may be spaced or not spaced relative to one another. A shrink-wrapper is able to discharge a single-file or multi-file flow. A boxing machine preferably discharges a single-file flow.

A further subject of the invention is a method implementing the device as described above, namely a method for producing at least one batch 2 of products 3 having a predefined configuration from a plurality of products 3 for palletizing in layers carried out downstream, characterized in that it comprises at least the following steps:

(i) transferring each product 3 originating from an upstream conveyor 4 advancing in a first conveying direction 6 and on which the products 3 are aligned in a row 5 onto a shuttle 10 carried by a rail 9, 11 in a first transfer direction 12 preferably parallel to the first conveying direction 6, said shuttles being constituted by a lower part and an upper part, (ii) moving the shuttles 10 along the rail 9, 11 toward a downstream receiving surface 7 independently of one another, modifying the relative position of the shuttles in order to adjust the distance between the products 3 that they carry and to obtain, in the vicinity of said downstream receiving surface 7, at least one batch 2 of products 3 having a predefined configuration.

Step (ii) is executed after step (i).

According to a possible additional feature, the method further comprises a step (iii) of simultaneous transfer of the products 3 forming a batch 2 of products 3 from shuttles 10 onto a downstream receiving surface 7 in a second transfer direction 14 perpendicular to the direction of travel of the shuttles 10 on the rail 9, 11 at this location.

Step (iii) is effected after step (ii).

According to a possible additional feature, at the time of step (ii) of moving the shuttles, the upper part of at least one shuttle undergoes a rotation on the vertical axis, preferably through an angle of 90°.

Thus, in a batch 2 of one layer, at least one of the products 3 may have an orientation about the vertical axis that is different from at least one other product 3 in the same batch 2.

Figure 1:
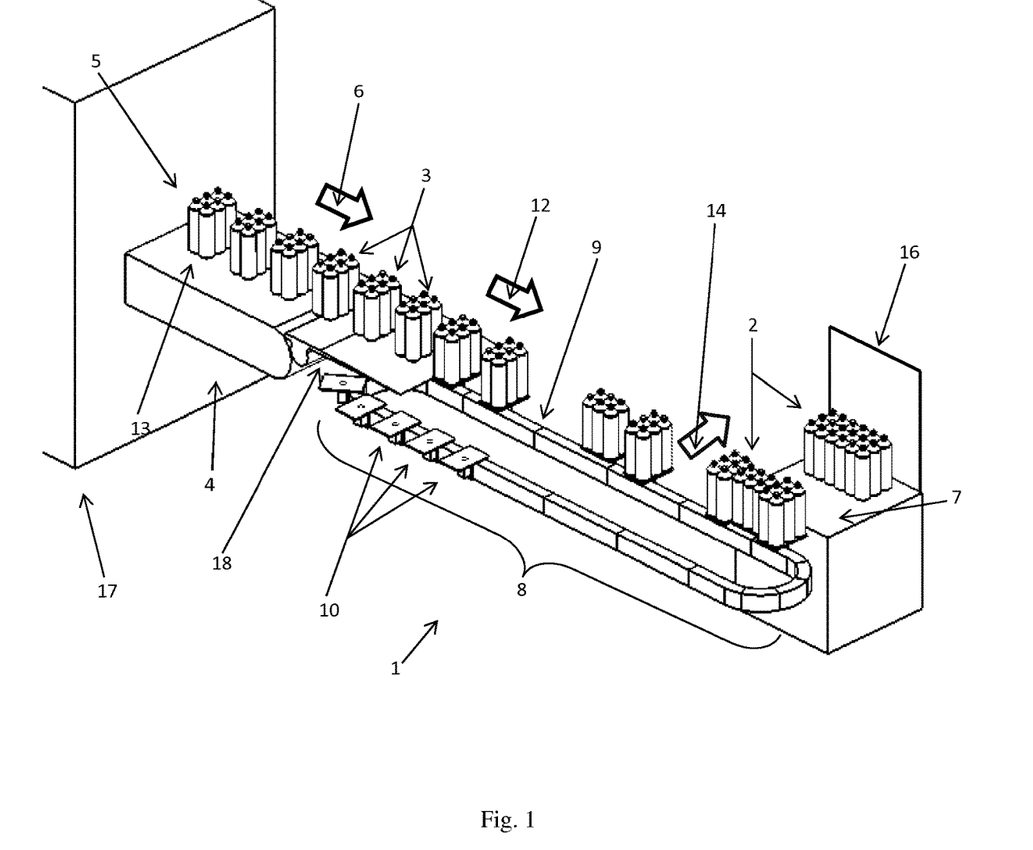
FIG. 1 shows a perspective view of a producing device according to one embodiment of the invention.

In the embodiment illustrated in FIG. 1, the producing device 1 has an upstream conveyor 4 lying in a horizontal plane, which may, notably, be a belt conveyor. The products 3 travel by virtue of this upstream conveyor 4 as a single file, spaced from one another, in a first conveying direction 6.

The products 3 are generally boxes or bundles containing objects of bottle, flask, can, etc. type. In principle, said objects are presented substantially in the form of a rectangular parallelepiped. The objects are preferably arranged along the height of the parallelepiped, i.e. vertically, and with their opening facing upward. However, they may also be arranged with their opening facing downward. They are grouped in a rectangular pattern, with or without being staggered.

Upstream of this producing device 1, there is therefore an item of equipment, for example of the bundling-machine or boxing-machine type, which groups together and binds the objects together either in the form of self-supporting bundles or in boxes for conveying the products 3. Thus, by means of this item of equipment, the products 3 are usually all oriented in an identical manner on the conveyor 4. In other words, the lengths and widths of the bases of the products 3 are all parallel to one another. For example, according to a first variant embodiment, shown in FIGS. 1 and 2, the lengths of the bases of the products 3 may be perpendicular to the first conveying direction 6 of the upstream conveyor 4 and the widths of the bases of the products 3 may be parallel to the first conveying direction 6 of the upstream conveyor 4. According to this first variant, the products are oriented transversely. According to a second variant embodiment (not shown), the lengths of the bases of the products 3 may be parallel to the first conveying direction 6 of the upstream conveyor 4 and the widths of the bases of the products 3 may be perpendicular to the first conveying direction 6 of the upstream conveyor 4. According to this second variant, the products are oriented longitudinally. The machine upstream of the device 1 according to the invention, namely, notably a boxing machine or a shrink-wrapper, usually discharging the products 3 at regular time intervals, the products 3 are generally all spaced by the same distance on the upstream conveyor. However, notably in the case where the upstream machine is a boxing machine, it may be that the products 3 lie against one another at the outlet from this machine. Furthermore, in certain cases in which the products 3 are spaced from one another, a situation arises in which the space is not regular between successive products 3, notably owing to variation(s) in rate in the machine upstream of the device 1.

Figure 2:
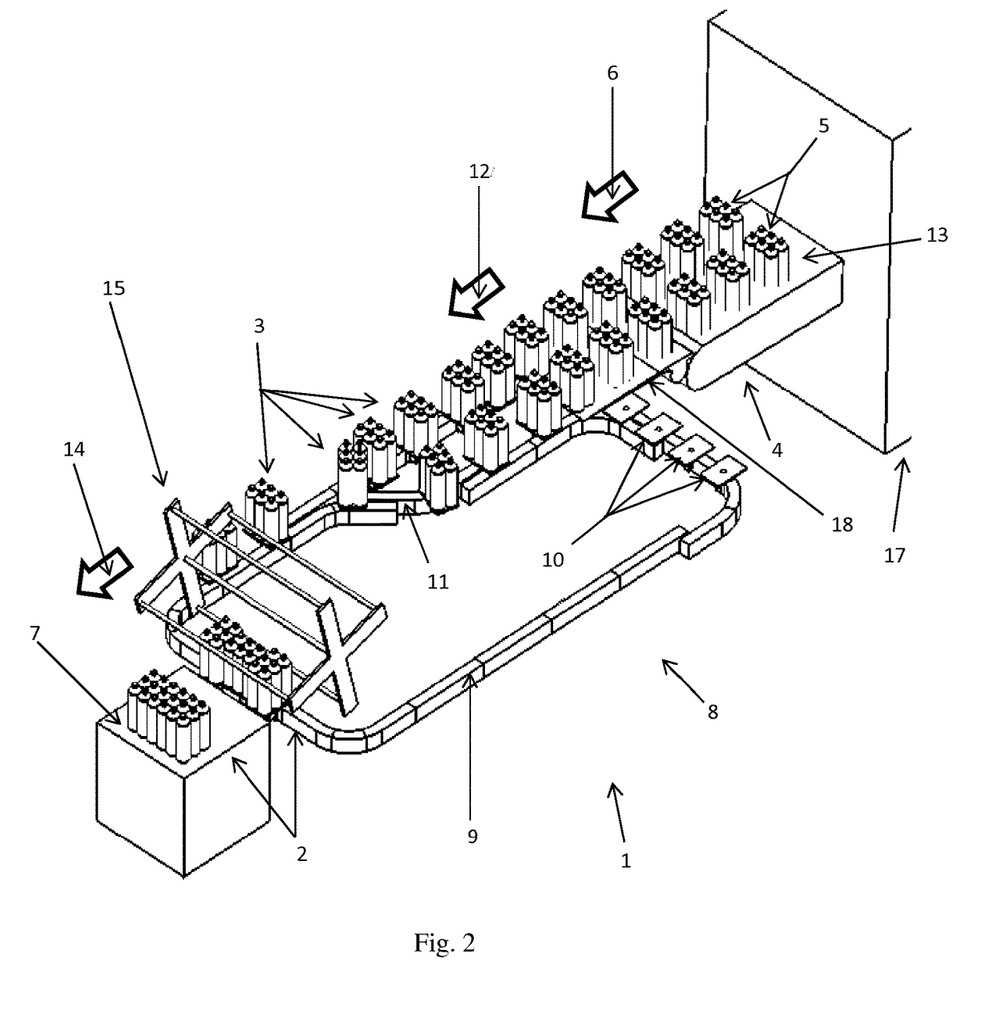
FIG. 2 shows a perspective view of a producing device according to another embodiment of the invention.

The producing device 1 is equipped with a moving means 8, the role of which is to transport the products 3 originating from the upstream conveyor 4 as far as a downstream receiving surface 7, while grouping together products 3 in order to form batches 2 having a predetermined configuration for palletizing in layers carried out downstream. Thus, as shown in FIGS. 1 and 2, the moving means 8 makes it possible to progress from an organization of the products 3 as a spaced row at the outlet from the shrink-wrapper or boxing machine to an organization in which a plurality of products 3 lie against or close to one another in an optimized arrangement for carrying out palletization. The moving means 8 also makes it possible to progress from an organization of the products 3 as a compact row at the outlet from a boxing machine (i.e. with no space between successive products in one and the same row) to an organization in which a space is provided for groups of products 3 arranged in an optimized arrangement for carrying out palletization.

Each batch 2 of products 3 formed using the moving means 8 comprises a set of products 3, i.e. at least two products 3 close together, and is spaced from the preceding batch and from the following batch. A batch 2 of products 3 corresponds to a set of products 3 that are simultaneously transferred onto the downstream receiving surface 7. A batch 2 corresponds to a row or part of a row of a layer of products 3 present on a pallet at the outlet from a palletizing device present downstream of the producing device 1. A row typically corresponds to a series of products 3 side by side, with or without contact between the products, extending from one side to the other of the pallet and just one product wide. Preferably, the products in one and the same batch and thus in one and the same row lie against one another. In other words, a batch 2 of products 3 corresponds to a group of products 3 arranged one beside another, i.e. extending in a single direction, these products 3 generally lying against one another, it being understood that a space may likewise be provided between two successive products 3, depending on the palletizing scheme under consideration. The configuration of the batches 2 is predetermined such that each batch 2 corresponds to a row or part of a row of a layer of a palletizing scheme. That which defines the configuration of a batch 2 is the number of products 3 constituting the batch, the space between these products 3 and also their orientation. Two batches 2 may be different from one another. More precisely, the elements that may be different from one batch to another are the product number, the space between the products and also their orientation on the vertical axis. The progression from the configuration as a row 5 to the configuration in the form of batches 2 by means of the moving means 8 is described here.

The moving means 8 thus comprises at least one main rail 9 on which moves a plurality of shuttles 10 that can move independently of one another in the sense that it is possible to bring them closer together or to move them further apart from one another depending on whether it is desired to form batches 2 of products 3 or to space the batches 2 from one another. The main rail 9 thus defines a travel loop connecting the upstream receiving zone and the downstream receiving surface 7 and lies in a horizontal plane.

These shuttles 10 are each capable of receiving a product 3 at the outlet from the upstream conveyor 4 and of moving it to the downstream receiving surface 7. More precisely, each shuttle has a substantially planar, horizontal upper surface intended to support at least one product 3 and preferably a single product 3. The products 3 thus rest on the upper surface of the shuttles 10. Generally, the shuttles 10 are constituted by a lower part, which interacts with the rail 9, and an upper part, also called the platform. The upper surface of the shuttles 10 corresponds to the upper surface of their platform. The platforms of the shuttles 10 may either be rectangular or circular or even oval in shape, for example. Preferably, they are of rectangular shape. They may be solid or perforated such as then to form a grate or the like.

The shuttles 10 are movable in a controlled, known manner, which makes it possible advantageously to ascertain precisely at any instant the position of the product 3 that they are moving. To this end, the movement of the shuttles 10 is driven by virtue of a magnetic linear motor principle, which offers the advantage of managing and controlling the position and the speed of each shuttle separately. Unlike the solutions developed in the prior art, the device 1 according to the invention thus makes it possible precisely to control the space between two successive products 3.

The shuttles 10 being movable independently of one another, they are notably capable of moving closer to one another such that two products 3 carried by two shuttles 10 following one another can move closer together or even enter into contact such as to form a batch 2 of products 3. Two successive shuttles are likewise capable of moving further apart from one another such as to create a space of a chosen distance between two successive batches 2. In other words, the gap between two shuttles 10 may evolve dynamically such that products 3 may be grouped together to form batches 2 or moved further apart in order to separate two batches 2. Thus, the shuttles 10 of the device 1 are not mechanically connected to one another. The device 1 according to the invention thus makes it possible to form batches 2 comprising a chosen number of products 3, it being possible for this number to correspond to the number of products 3 required per row in a layer of products deposited on a pallet when the products 3 are palletized.

Preferably, with a view to it being easier to form batches 2 of products 3, the dimensions of the shuttles extending in the horizontal plane in which the main rail 9 lies are smaller than or equal to the length and the width of the base of the products 3. In other words, if the device 1 according to the invention is viewed from above, it is not possible to distinguish the shuttles that support the products 3. Indeed, if these conditions relating to size are not respected, when two shuttles 10 lie against one another the products 3 carried by them cannot enter into contact with one another.

The upper part of the shuttles 10, in other words their platform, may be integral with the lower part and thus with the rail 9. However, according to a preferred embodiment, as shown in FIGS. 1 and 2, the platforms of the shuttles are movable in rotation on a vertical axis. Thus, the upper parts of the shuttles 10 are capable, independently of one another, of effecting a rotation movement on the vertical axis such as to modify the orientation of the products they carry. Preferably, this is a rotation through an angle of 90° or even 180°. This rotation movement may be implemented not only if the shuttles are stationary but also if they are in the course of moving along the rail. Preferably, the platforms of the shuttles 10 undergo such a rotation movement when the shuttles 10 move on the rail, in order to work in masked time. Thus, according to this embodiment, the batches 2 of products 3 may not only comprise a specific number of products owing to the fact that the shuttles 10 are able to move closer together or further apart from one another, but these products 3 can furthermore be oriented differently from one another depending on the configuration required for the row for palletizing. FIGS. 1 and 2 show, for example, a batch 2 of three products 3 present on shuttles just prior to their transfer onto the downstream receiving surface 7. In these batches, the two products located at the ends of the batch have retained their original orientation, whereas the product in the middle has undergone a rotation through 90°. The rotation of the products 3 on the shuttles 10 may be performed notably with the aid of the systems described below.

The shuttles 10 may comprise a rotational drive system enabling their platform to perform a rotation on the vertical axis. This may, notably, be a motor onboard all or some of the shuttles 10.

Alternately, the device 1 according to the invention may comprise an element located outside of the shuttles that is capable of rotating some or all of the platforms of the shuttles 10 on the vertical axis. In other words, the element causing the rotation of the platforms is no longer carried on the shuttle that carries the product to be turned. Thus, according to this variant, the platforms may perform a rotation on the vertical axis by virtue of an exterior element enabling the upper parts of the shuttles to turn if desired.

Such an exterior element is, for example, a stop against which a part of the platform of the shuttle, in particular one or more stud(s) arranged under the platform, collides. This stop may, for example, be in the form of a bar extending along the vertical axis, the top end of which is at the height of the platforms, in particular of the stud(s), but remains offset relative to the lower part of the shuttles with a view to not impeding their travel on the rail 9. This stop may also be a bar extending along the horizontal axis, of which the end closest to the platforms enters into contact therewith without entering into contact with the lower part of the shuttles. When a stud of the platform enters into contact with the stop, the shuttle continues to travel on the rail while the stop remains fixed throughout the duration of the contact. The rotation of the platform is then generated owing to the fact that the center of gravity of the stop is outside the vertical plane passing through the center of gravity of the platform and which is parallel to the direction of travel of the shuttle at the moment the shuttle and the stop enter into contact.

Such an exterior element may also be a cam that is able, for example, to guide a stud carried along a path, causing the platform to rotate. Irrespective of the nature of the exterior element, the stud(s) arranged on the platform is (are) offset relative to the axis of rotation of the platform.

Such a stop or cam may be retractable such that it turns only certain platforms, depending on the configuration desired for the batch to be formed. In the rest position, the stop or cam is arranged such that it does not enter into contact with the stud(s) carried by the shuttles. In order to pivot a product, a command may, for example, actuate a ram that causes the stop or the cam to undergo a translational movement such that it enters into contact with a stud of the platform to be turned. Preferably, when such a stop or cam system is implemented to turn the platforms, these latter are locked in rotation except during the precise moment when the platforms are pivoted, if desired. This makes it possible to prevent the platforms from turning randomly, for example through the effect of their travel over a curved part of the rail.

Such an exterior element may also be an additional shuttle likewise traveling on the rail 9 and connected to a shuttle 10. In principle, such an additional shuttle lacks a platform, i.e. it is not intended to carry a product 3. Each additional shuttle is coupled to a shuttle 10, more precisely at the axis of vertical rotation of the platform of a shuttle 10 and travels just in front of or just behind the shuttle 10. There is thus no shuttle 10 between an additional shuttle and the shuttle 10 with which it is associated. It is the relative movement of the additional shuttle relative to the shuttle 10 with which it is associated that gives rise to the rotation of the platform of this shuttle 10.

By way of example, the platform of a shuttle 10 and the additional shuttle to which it is coupled may be connected in the following ways. They may be connected by a rod-type system, i.e. by a bar attached first to the additional shuttle and second at the axis of rotation of the platform and comprise at least one pivot or swivel link. Such a system has to be offset relative to the axis of rotation of the platform of the shuttle 10.

Another possibility is that one end of a bar is attached to the additional shuttle and at its other end comprises a rack that interacts with a toothed wheel placed on the shuttle 10. More precisely, such a toothed wheel is carried by the axis of rotation of the platform of the shuttle 10 and is integral with this axis. The rotation of such a wheel thus entrains the platform carried by this axis in rotation.

When the platform carried by a shuttle 10 must not turn, the shuttle 10 and the additional shuttle connected to it travel on the rail 9 at a constant distance during their movement on the rail 9. In order to turn the platform 10, it then suffices to modify the distance between the two shuttles. In other words, the two shuttles have to be brought closer together to one another or moved further apart by increasing or decreasing the speed of one or the other.

With a view to enabling two products 3 carried by two successive shuttles 10 each connected to an additional shuttle to enter into contact for the formation of a batch, the additional shuttles and also the lower parts of the shuttles 10 are smaller than the platforms of the shuttles 10. Thus, the dimensions of the lower parts of the shuttles 10 and of the additional shuttles are such that each additional shuttle may preferably:

either be entirely under the platform of the shuttle 10 to which it is connected;

or be partially under the platform of the shuttle 10 to which it is connected, such that that part of the additional shuttle that is not under the platform of the shuttle 10 to which it is connected is under the platform of the next shuttle 10.

According to a first particular embodiment (not shown), products 3 from the upstream conveyor 4 are transferred onto the shuttles 10 simply with the aid of the movement of the upstream conveyor 4. To this end, the horizontal plane in which the main rail 9 lies is located downward in the vertical direction relative to the horizontal plane in which the upstream conveyor 4 lies. More precisely, the upper surface of the shuttles 10 intended to receive the products 3 is located below relative to the upper surface of the upstream conveyor, i.e. the surface 13 of the upstream conveyor 4 supporting the products 3.

Generally, according to this embodiment, the upstream conveyor 4 does not correspond to the outlet conveyor of the item of equipment 17 upstream of the device 1 according to the invention, namely, notably, a shrink-wrapper or a boxing machine. Indeed, outlet conveyors of this type of machine have a relatively large winding diameter, which means that they are relatively thick. There is thus a risk of the products 3 falling when they are transferred onto the shuttles 10, notably when the shuttles are traveling in a direction parallel to the first conveying direction 6 immediately after transfer of the products. Indeed, in this case, the rail must necessarily pass under the upstream conveyor 4 before the zone of transfer of the products onto the shuttles, which means that at the time of transfer the products 3 are offset downward by a height at least equal to that of the winding diameter of the upstream conveyor 4.

Thus, in order to limit the risks of products 3 falling when they are transferred onto the shuttles 10, the upstream conveyor 4 is generally a conveyor located in the extension of the outlet conveyor of the item of equipment upstream of the device 1 according to the invention, along the outlet conveying direction of this item of equipment upstream. In particular, the conveyor 4 may be in the extension of an intermediate conveyor that is itself located in the extension of the machine upstream of the device 1. In this case, the upstream conveyor 4 differs from the outlet conveyor of the shrink-wrapper or boxing machine, for example, and even from the intermediate conveyor, in that it is thinner at least at its downstream end.

In other words, the winding diameter of the upstream conveyor 4 is smaller than that of the outlet conveyor of the preceding machine and, if appropriate, that of the intermediate conveyor. These two, or even three, conveyors travel in the same conveying direction, namely the first conveying direction 6, and preferably at the same speed. Thus, packs exiting the shrink-wrapper travel successively on the outlet conveyor of the shrink-wrapper then potentially on an intermediate conveyor, then on the upstream conveyor 4 prior to being transferred onto the shuttles 10.

According to a second particular embodiment, the transfer of the products 3 from the upstream conveyor 4 onto the shuttles 10 takes place with the aid of an upstream transverse pusher. Such a pusher pushes the products 3 from the rear in a direction parallel to the first conveying direction 6. It generally pushes the products 3 at a speed substantially equal to that of the upstream conveyor 4. This may, notably, be a sweeping pusher or a rotary pusher. Preferably, the upstream transverse pusher is a product infeed system. When the upstream transverse pusher is a product infeed system, the flight bar is synchronized with the product 3 to be pushed such that it enters into contact only with the required product 3, doing so with a force such that it can push this product 3 but not knock it over.

The horizontal plane defined by the upper surfaces of the shuttles intended to receive the products 3 may be located at the same height, preferably slightly downward, relative to the upper surface of the upstream conveyor 4, i.e. the surface 13 of the upstream conveyor 4 supporting the products 3.

According to a first variant, the device 1 according to the invention comprises such a pusher arranged at the outlet from the upstream conveyor 4 such as to push the products 3 from behind from the upstream conveyor 4 onto the shuttles 10.

According to a second variant, as shown in FIGS. 1 and 2, the device 1 according to the invention comprises a dead plate 18, also called a transfer plate, located in the extension of the upstream conveyor 4 and extending in the first conveying direction 6. According to this embodiment, the products 3 are not transferred directly from the upstream conveyor 4 onto the shuttles 10 but transit via the transfer plate 18 located between the upstream conveyor and the moving means 8. The surface of the upstream conveyor 4 and the surface of the transfer plate 18 supporting the products 3 are in one and the same horizontal plane. As shown in FIGS. 1 and 2, the transfer plate 18 is much thinner than the upstream conveyor 4. The transverse pusher is arranged in this case on the dead plate 18 such as to push the products 3 from the rear along the dead plate 18 onto the shuttles 10.

The shuttles 10 are synchronized with the arrival of the products 3 that they are intended to support. Thus, when each shuttle 10 arrives precisely at the outlet from the upstream conveyor 4 or, if appropriate, from the transfer plate 18, i.e. when it is in the extension of this element, in the first conveying direction 6, said shuttle receives a product 3 on its surface. Reciprocally, each product 3 is received by a shuttle 10 upon arrival at the end of the upstream conveyor 4 or, if appropriate, at the end of the dead plate 18.

According to a preferred embodiment, the shuttles 10 are stationary when they receive a product 3. This embodiment is particularly preferred when the rail 9 extends in a direction perpendicular to the first conveying direction 6 in the upstream receiving zone, in other words, when the shuttles 10 travel in a direction perpendicular to the first conveying direction 6 when products 3 are transferred onto their upper surface.

According to another preferred embodiment, the shuttles 10 travel on the rail 9, 11 when they receive a product 3. This embodiment is particularly preferred when the rail 9 extends in a direction parallel to the first conveying direction 6 in the upstream receiving zone, in other words when the shuttles 10 travel along a direction parallel to the first conveying direction 6 when products 3 are transferred onto their upper surface. Preferably, the shuttles 10 travel at the same speed as the upstream conveyor 4 and/or, if appropriate, at the same speed as the products 3 when they are pushed by the upstream transverse pusher.

To this end, the products 3 are referenced before they are transferred onto the shuttles 10. If the device 1 according to the invention is provided with an upstream transverse pusher, it is this latter that references the products 3. Otherwise, a sensor may be arranged at the end of travel of the upstream conveyor 4 or, if appropriate, of the dead plate 18 in order to detect the products 3 and to provide the information necessary to synchronize the shuttles with the arrival of the products 3. Thus, by virtue of the synchronization of the shuttles 10 with the products 3 arriving toward them, each shuttle is able to receive a product 3 on its surface. The zone where the shuttles receive the products 3 may be called the upstream receiving zone. The products 3 are transferred onto the shuttles 10 in a first transfer direction 12 parallel to the first conveying direction 6, the shuttles 10 preferably being immobile during transfer of the products 3.

The rail 9 defines a travel loop that makes it possible to bring the products 3 from the upstream receiving zone onto the downstream receiving surface 7. Preferably, the portion of the rail 9 located around the upstream receiving zone is rectilinear.

According to a first variant, it may extend in the first conveying direction 6. In this case, as shown in FIGS. 1 and 2, the travel loop defined by the main rail 9 passes under the element arranged directly upstream of the moving means 8. In other words, the main rail 9 and thus the shuttles 10 travel under the upstream conveyor 4 or, if appropriate, under the transfer plate 18 just before the upstream receiving zone.

According to this variant, it is thus advantageous for the upstream conveyor 4 or the dead plate 18, if appropriate, to be as thin as possible such as to limit the falling height of the products 3 during their transfer onto the shuttles 10.

According to a second variant, the portion of the rail 9 located around the receiving zone may extend in a direction perpendicular to the first conveying direction 6. According to this variant, the portion of the rail 9 located around the upstream receiving zone extends along the upstream conveyor 4 or, if appropriate, the transfer plate 18 transversely to the first conveying direction 6 and the first transfer direction 12. In this case, if the device according to the invention is provided with an upstream transverse pusher, the upper surfaces of the shuttles 10 may be located at the same height as the element directly upstream of the moving means 8. Thus, the upper surface of the shuttles 10 may be in one and the same horizontal plane as that defined by the surface 13 of the upstream conveyor 4 or, if appropriate, the transfer surface 18. According to this variant, the shuttles 10 may also be located downward in the vertical direction relative to the horizontal plane in which the upstream conveyor 4 or, if appropriate, the transfer surface 18 extends.

As shown in FIG. 1, the products 3 traveling on the upstream conveyor 4 form a single row 5. However, they may also form two rows 5, or even three or four rows 5. When they travel in a plurality of rows 5, they may travel either on a single upstream conveyor 4 or on a plurality of different conveyors. For example, a conveyor may be dedicated to one row 5 of products 3. FIG. 2 shows products 3 traveling as two rows on the upstream conveyor 4. When the products 3 travel in multiple rows on the upstream conveyor 4, the different rows are parallel to one another and extend in the first conveying direction. A flow may notably have multiple rows owing to the fact that the machine located directly upstream of the device according to the invention, for example a shrink-wrapper, delivers products 3 as a multiple-row flow. There may also be multiple rows owing to the presence of a plurality of machines arranged side by side, parallel to one another, upstream of the device 1, each discharging a single-row flow of products 3.

Thus, when the flow of products 3 traveling on the upstream conveyor 4 is in multiple rows, the moving means 8 according to the invention comprises at least one additional rail 11 on which a plurality of shuttles 10 travels in order for it to be possible to transfer each product 3 onto the moving means 8. An upstream flow of products 3 in the form of two columns, as shown in FIG. 2, thus requires an additional rail 11, the shuttles of the main rail 9 receiving the products 3 from one column and the shuttles 10 of the additional rail 11 receiving the products 3 from the other column. Similarly, an upstream flow of products 3 in the form of three columns, or in the form of four columns, requires, respectively, two or three additional rails 11.

Thus, when the device 1 according to the invention comprises at least one additional rail 11, the main 9 and additional 11 rails travel parallel to one another in the upstream receiving zone, in the first conveying direction 6. They are each arranged in the extension of a row of products 3 traveling on the upstream conveyor 4 or, if appropriate, on the transfer plate 18. The main and additional rails thus travel under the upstream conveyor 4 or, if appropriate, the dead plate 18 precisely before the shuttles 10 receive the products 3. Products 3 are transferred onto the shuttles 10 traveling on an additional rail in the same way as if the shuttles 10 were traveling on the main rail 10.

According to a first embodiment shown in FIG. 2, when the device 1 according to the invention is provided with a single additional rail 11, it may be arranged around the upstream receiving zone. In other words, the additional rail 11 is connected to the main rail 9 by means of two switches located respectively before and after the upstream receiving zone. Thus, the shuttles 10 travel on the main rail 9 in the portion of the rail 9 located before the separation of the main rail 9 into two tracks, i.e. before a first switch. The shuttles 10 are then distributed on the main rail 9 and the additional rail 11 before arriving in the upstream receiving zone. Having arrived in the upstream receiving zone, the shuttles traveling on the main rail 9 and on the additional rail 11 recover products 3 and travel in substantially parallel, rectilinear directions, in the first conveying direction 6. A second switch, generally located upstream of the downstream receiving surface 7, then enables the two tracks to be joined up such that all the shuttles surmounted by products 3 then travel solely on the main rail 9. According to this embodiment, the additional rail extends from the first switch as far as the second switch. Before the second switch, the shuttles 10 traveling on the main rail 9 are synchronized with those traveling on the additional rail in order to prevent them colliding at the switch. Generally, the shuttles 10 traveling downstream of the second switch originate alternately from the main rail 9 and the additional rail 11.

According to a second embodiment, when the device 1 according to the invention is provided with a single additional rail 11, it defines a travel loop independent of the travel loop defined by the main rail. The two travel loops do not intersect and thus do not have switches. They extend in a single horizontal plane. In this case, the shuttles 10 traveling on the main rail 9 and on the additional rail 11 form, independently of one another, batches 2 of products 3 that they then deposit on one and the same downstream receiving surface 7 or on two distinct downstream receiving surfaces 7. The fact that there are two distinct downstream receiving surfaces 7 makes it possible advantageously simultaneously to form two layers to be arranged on a pallet. If the device according to the invention comprises a single downstream receiving surface 7, the rails 9 and 1 each extend along an opposite side of this surface 7.

Figure 3:
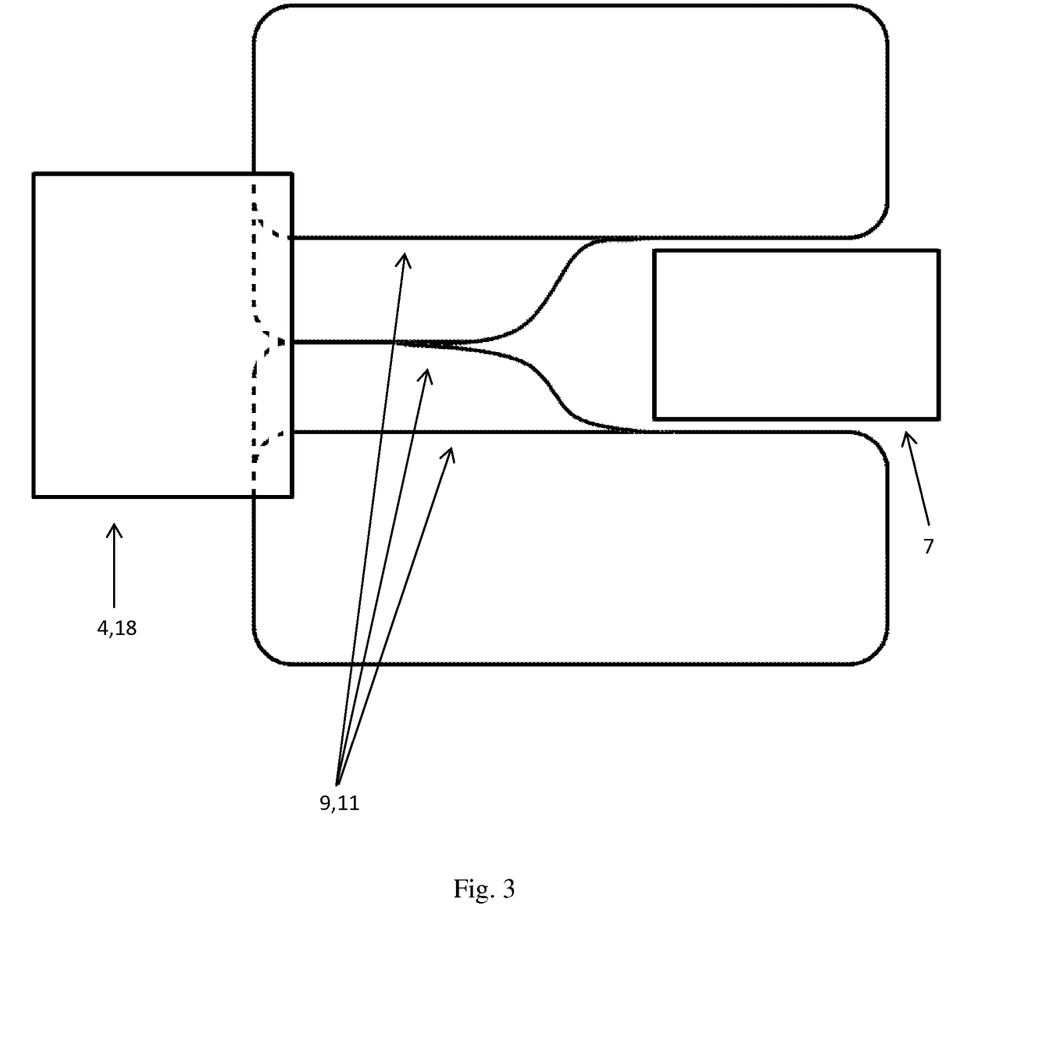
FIG. 3 shows a schematic top view of a producing device according to yet another embodiment of the invention.

When the device according to the invention is provided with two or more additional rails, there is a maximum of two independent travel loops. By way of example, FIG. 3 schematically shows a plan view of the device according to the invention in which the moving means 8 comprises a main rail and two additional rails. In this figure, two rails form travel loops that are independent of one another in order to cause products 3 to travel from the upstream conveyor 4 (or the transfer surface 18 if the device comprises one of these) as far as the downstream receiving surface, while forming batches 2. The third rail may originate from the bunching-together of two rails each exiting a switch located on each of the travel loops before the upstream receiving zone. Between the upstream receiving zone and the downstream receiving surface 7, the third rail divides into two rails by means of a switch, each of its two rails then joining up with a different independent travel loop.

As indicated above, the device according to the invention comprises one or more downstream receiving surface(s) 7 intended to receive the batches 2 of products 3 formed with the aid of the moving means 8. The downstream receiving surface 7 preferably extends in a horizontal plane. It is thus parallel to the surface 13 of the upstream conveyor 4 supporting the products 3 and to the rail 9, 11.

This surface 7 is arranged along the main rail 9 or an additional rail 11 sufficiently far from the upstream conveyor 4 such that the moving means is able to convert the products 3 in a row, spaced regularly from one another, into batches 2 having a configuration corresponding to a part of a palletizing scheme. In principle, the portion of the rail 9, 11 adjoining the downstream receiving surface 7 is substantially rectilinear with a view to making the transfer of the batch 2 onto the surface 7 easier.

The downstream receiving surface 7 is generally arranged outside the loop defined by the main rail 9 with a view to making use of the device 1 more convenient. When the device according to the invention comprises two travel loops that are independent of one another, the receiving surface is typically located between the two loops in a zone where the rails of these two loops adjoining the downstream receiving surface 7 are substantially parallel with a view to bordering two opposite edges of this surface.

The downstream receiving surface 7 is preferably of rectangular shape. When the device 1 comprises a single travel loop, the width of the downstream receiving surface 7 is generally located along the main rail 9. When the device 1 comprises two travel loops for one downstream receiving surface, the length of the downstream receiving surface 7 is generally located along the rails 9 and 11.

Each batch 2 of products 3 arriving along the downstream receiving surface 7 is thus transferred onto the latter in a second transfer direction 14 perpendicular to the travel direction of the shuttles carrying the batch 2 along the downstream receiving surface 7. All the products 3 in a batch 2 are transferred simultaneously from the moving means 8 toward the downstream receiving surface 7. As shown in FIG. 1, the second transfer direction 14 may be perpendicular to the first conveying direction 6 and to the first transfer direction 12. As shown in FIG. 2, the second transfer direction 14 may also be parallel to the first conveying direction 6 and to the first transfer direction 12. Preferably, the shuttles 10 are immobile when batches 2 are transferred onto the downstream receiving surface 7.

Relative to the platforms of shuttles 10, the downstream receiving surface 7 is in principle at the same height or else offset downward in the vertical direction with a view to making it easier for the batches 2 to be received. However, in certain embodiments detailed below, it is possible for the downstream receiving surface 7 to be offset upward in the vertical direction.

The device 1 according to the invention may also comprise a means intended to transfer the batches 2 from the platforms of the shuttles 10 onto the downstream receiving surface 7. This may notably be a downstream transverse pusher 15 as shown in FIG. 2 or a gripping means.

Thus, according to a first particular embodiment shown in FIG. 2, the batches 2 are transferred from the shuttles 10 onto the downstream receiving surface 7 with the aid of a downstream transverse pusher 15. Such a pusher simultaneously pushes the products 3 from one and the same batch 2 from the rear in a direction perpendicular to the direction of travel of the shuttles arriving at this point. Just like the upstream transverse pusher, this may notably be a sweeping pusher or a rotary pusher. Preferably, the downstream transverse pusher is a product infeed system.

According to this embodiment, the horizontal plane defined by the downstream receiving surface 7 may be located at the same height or be preferably slightly below relative to the upper surfaces of the shuttles 10 supporting the products 3.

According to a second particular embodiment, the batches 2 are transferred from the shuttles 10 onto the downstream receiving surface 7 with the aid of a gripping means. Such a gripping means simultaneously seizes the products 3 constituting one and the same batch 2, moves them and then deposits them on the downstream receiving surface 7. This may notably be a gripper controlled by a robot.

According to this embodiment, the horizontal plane defined by the downstream receiving surface 7 may be located at the same height or be offset downward or upward in the vertical direction relative to the upper surfaces of the shuttles 10 supporting the products 3. Preferably it is located slightly below relative to the upper surfaces of the shuttles 10 supporting the products 3.

According to one embodiment of the invention, the device 1 according to the invention may be used to form palletizable layers from batches 2 present on the downstream receiving surface 7. In the layers formed with the aid of the device according to the invention, the products 3 are arranged in accordance with the predefined palletizing scheme.

According to a first variant of this embodiment, the layers are formed by accumulation of the batches 2 against a retention surface 16, as shown in FIG. 1. To this end, the downstream receiving surface 7 may be carried by a downstream conveyor traveling in a second conveying direction. A vertical retention surface 16 is then arranged in a direction transverse to the second conveying direction. The batch 2 furthest downstream is then held against the retention surface 18 such as to group together a plurality of batches 2 of products 3. The layer is thus formed by accumulation of successive batches 2 against one another. The downstream conveyor may extend in a direction parallel or perpendicular to the direction in which the upstream conveyor 4 lies. In other words, the first conveying direction 6 and second conveying direction are parallel or perpendicular to one another.

If the device 1 according to the invention is provided with a single travel loop defined by the main rail 9, the second conveying direction is generally parallel to the second transfer direction 15. If the device 1 according to the invention is provided with two travel loops defined by the main rail 9 and an additional rail 11, the second conveying direction is generally perpendicular to the second transfer direction 15. In this case, the downstream conveyor is preferably a distribution conveyor having rollers oriented perpendicularly to the second conveying direction. The use of such a conveyor enables the batches 2 to be easily transferred onto the downstream conveyor in a second transfer direction 14 that is perpendicular to the second conveying direction.

According to a second variant of this embodiment, the layers are formed by bunching together the batches 2 present on the downstream receiving surface 7. In order for a plurality of batches 2 to be present on the downstream receiving surface 7, a batch 2 arriving after another batch on this surface may, for example, push the preceding batch in the second transfer direction 14. Another possibility is that the downstream receiving surface 7 is carried by a downstream conveyor traveling in a second conveying direction. In this case, the downstream conveyor accompanies the transfer of the batches 2 onto the downstream receiving surface 7 and prevents the sliding of the products 3 on this surface 7. The device 1 according to the invention may thus comprise a gripping means capable of bunching the products 3 of a plurality of batches 2 against one another such as to form a palletizable layer. Once the number of batches corresponding to a layer has been deposited on the downstream receiving surface, the gripping means is actuated in order to bunch the products 3 together and to form a palletizable layer.

A palletizer may be arranged downstream of the device 1 according to the present invention. When the palletizable layers are prepared on the device 1 according to the invention as described above, the palletizer successively transfers the layers of products 3 from the downstream receiving surface 7 onto a pallet such as to stack the layers one upon another. An insert, in the form of a leaf, for example in cardboard, plasticized material or the like, may or may not be placed in order to separate two successive layers of products 3 on the pallet. A palletizer may be provided with a handling arm carrying a gripping means capable of seizing layers of products 3 such as to hold the products closely against one another.

When the products 3 are arranged in the form of batches 2 at the outlet from the device 1 according to the invention, the palletizer also has the role of forming the palletizable layers. It then seizes the batches 2 of products in order to bring them toward a layer-formation module that may function in a similar manner to when the layers are formed directly on the device 1. Next, it seizes the layers arranged on the layer-formation module in order to deposit them on a pallet in the same way as described above.

As may be seen from the aforesaid, the device 1 is located between a packing unit (typically a boxing machine or a shrink-wrapper) intended to hold a plurality of objects together in order to form a product and a palletization unit intended to bunch together a plurality of batches 2 formed within the device 1 such as to form palletizable layers, and then to stack a plurality of layers on one and the same pallet.

The device 1 thus contributes to the formation of palletizable layers since it makes it possible to form batches 2 of products 3, which correspond to a part of a row, or even a complete row, of a palletizable layer, the products 3 being arranged within the batch 2 in accordance with the envisaged palletizing scheme.

Generally, the packing unit is located directly upstream of the device 1 and the palletization unit directly downstream of the device 1, i.e. there is no machine for processing the products 3 on the one hand between the packing unit and the device 1 and on the other hand between the device 1 and the palletization unit. Of course, there may be means for moving the products 3 of the conveyor type between these different entities.

The packing unit is also called a machine 17, which delivers the products 3 aligned in a row 5. The palletization unit comprises, in principle, a device for forming palletizable layers from batches 2 of products 3 and a palletization device for stacking the palletizable layers on a pallet.

The device for forming palletizable layers is located, in principle, directly at the outlet from the device 1 as described below, at the downstream receiving surface, and may, for example, comprise a retention surface 16 acting as a stop or a gripping means capable of bunching the batches 2 together.

Thus, the installation according to the invention may comprise a device 1 for producing batches 2 of products 3 and, furthermore, mounted directly downstream of said producing device 1, a device for forming palletizable layers from batches 2 of products 3 and a palletization device for stacking the palletizable layers on a pallet.

This installation may further comprise, mounted directly upstream of said producing device 1, a machine 17 delivering the products 3 traveling aligned as a row 5 in a first conveying direction 6.

By virtue of the invention, it is thus possible to propose a solution for forming batches 2 of products 3 having a predetermined configuration for palletizing that is versatile, reliable and limits the risk of spoiling the products owing to the fact that its implementation gives rise to little relative movement between the products 3 and their support.

Although the above description is based on particular embodiments, it in no way limits the scope of the invention, and modifications may be made, notably by substituting technical equivalents or by means of a different combination of all or some of the features set forth above.

The invention claimed is:

1. A device (1) for producing batches (2) of products (3) from a plurality of products (3), said batches having a predefined configuration for palletizing in layers carried out downstream, said device comprising:
   an upstream conveyor (4) which extends in a first conveying direction (6) and on which the products (3) are aligned in a row (5);
   a downstream receiving surface (7) intended to receive said batches (2); and
   a moving means (8) intended to transfer the products (3) brought by the upstream conveyor (4) to the downstream receiving surface (7);
   wherein,
   the moving means (8) comprises a main rail (9) and a plurality of shuttles (10) that are movable independently of one another and travel on said rail (9), each shuttle being intended to receive at least one product (3) on its upper surface, and
   a batch (2) of products (3) corresponds a row or part of a row of a layer to be palletized.

2. The device as claimed in claim 1, wherein said shuttles (10) are constituted from a lower part interacting with the rail (9) and an upper part intended to support at least one product (3), the upper parts of said shuttles (10) being able to undergo, preferably independently of one another, a rotation on the vertical axis, preferably through an angle of 90°.

3. The device as claimed in claim 2, wherein at least one shuttle (10) carries a rotation system to enable its upper part to undergo a rotation on the vertical axis.

4. The device as claimed in claim 2, wherein said device further comprises an element arranged outside of said shuttles (10), this element being capable of causing the upper part of at least one shuttle (10) to undergo a rotation on the vertical axis.

5. The device as claimed in claim 2, wherein said device further comprises an upstream transverse pusher (12) intended to transfer the products (3) from the upstream conveyor (4) onto the shuttles (10) of the moving means (8) in a first transfer direction (12) parallel to the first conveying direction (6).

6. The device as claimed in claim 2, wherein the upper surface of said shuttles (10) is offset downward in the vertical direction relative to the surface (13) of said upstream conveyor (4) supporting the products (3) such that the products (3) descend on the shuttles (10) owing to the movement of said upstream conveyor (4).

7. The device as claimed in claim 2, wherein said device further comprises a gripping means intended to seize the batches (2) of products present on the shuttles (10) and to transfer them toward the downstream receiving surface (7) in a second transfer direction (14) perpendicular to the direction of travel of the shuttles (10) on the main rail (9) at this location.

8. The device as claimed in claim 2, wherein said device further comprises a downstream transverse pusher (15) intended to transfer the batches (2) of products (3) present on the shuttles (10) toward the downstream receiving surface (7) in a second transfer direction (14) perpendicular to the direction of travel of the shuttles (10) on the main rail (9) at this location.

9. The device as claimed in claim 2, wherein the downstream receiving surface (7) is carried by a downstream conveyor intended to move the batches (2) of products (3) in a second conveying direction preferably parallel or perpendicular to the second transfer direction (14) of the batches (2) of products (3) from the shuttles (10) onto the downstream receiving surface (7).

10. The device as claimed in claim 1, wherein the moving means (8) comprises at least one additional rail (11) distinct from said main rail (9) downstream of the upstream conveyor (4), the main (9) and additional (11) rails then joining up on a single track before the downstream receiving surface (7).

11. The device as claimed in claim 1, wherein said device further comprises an upstream transverse pusher (12) intended to transfer the products (3) from the upstream conveyor (4) onto the shuttles (10) of the moving means (8) in a first transfer direction (12) parallel to the first conveying direction (6).

12. The device as claimed in claim 1, wherein the upper surface of said shuttles (10) is offset downward in the vertical direction relative to the surface (13) of said upstream conveyor (4) supporting the products (3) such that the products (3) descend on the shuttles (10) owing to the movement of said upstream conveyor (4).

13. The device as claimed in claim 1, wherein said device further comprises a gripping means intended to seize the batches (2) of products present on the shuttles (10) and to transfer them toward the downstream receiving surface (7) in a second transfer direction (14) perpendicular to the direction of travel of the shuttles (10) on the main rail (9) at this location.

14. The device as claimed in claim 1, wherein said device further comprises a downstream transverse pusher (15) intended to transfer the batches (2) of products (3) present on the shuttles (10) toward the downstream receiving surface (7) in a second transfer direction (14) perpendicular to the direction of travel of the shuttles (10) on the main rail (9) at this location.

15. The device as claimed in claim 1, wherein the downstream receiving surface (7) is carried by a downstream conveyor intended to move the batches (2) of products (3) in a second conveying direction preferably parallel or perpendicular to the second transfer direction (14) of the batches (2) of products (3) from the shuttles (10) onto the downstream receiving surface (7).

16. An installation comprising a device (1) for producing batches (2) of products (3) as claimed in claim 1, further comprising, mounted downstream of said producing device (1), a device for forming palletizable layers from batches (2) of products (3) and a palletizing device for stacking the palletizable layers on a pallet.

17. The installation as claimed in claim 16, further comprising, mounted upstream of said producing device (1), a machine (17) delivering the products (3) traveling aligned in a row (5) in a first conveying direction (6), said machine being a shrink-wrapper or a boxing machine.

18. A method for producing at least one batch (2) of products (3) having a predefined configuration from a plurality of products (3) for palletizing in layers carried out downstream, comprising:
(i) transferring each product (3) originating from an upstream conveyor (4) advancing in a first conveying direction (6) and on which the products (3) are aligned in a row (5) onto a shuttle (10) separately carried by a rail (9, 11) in a first transfer direction (12) preferably parallel to the first conveying direction (6), said shuttles being constituted by a lower part and an upper part,
(ii) moving the shuttles (10) along the rail (9, 11) toward a downstream receiving surface (7) independently of one another, modifying the relative position of the shuttles in order to adjust the distance between the products (3) that they carry and to obtain, in the vicinity of said downstream receiving surface (7), at least one batch (2) of products (3) having a predefined configuration, a batch (2) of products (4) corresponding to a row or part of a row of a layer to be palletized.

19. The method as claimed in claim 18, further comprising a step (iii) of simultaneous transfer of the products (3) forming a batch (2) of products (3) from shuttles (10) onto a downstream receiving surface (7) in a second transfer direction (14) perpendicular to the direction of travel of the shuttles (10) on the rail (9, 11) at this location.

20. The method as claimed in claim 18, wherein at the time of the step (ii) of moving the shuttles, the upper part of at least one shuttle undergoes a rotation on the vertical axis, preferably through an angle of 90°.

* * * * *